Patented Mar. 3, 1953

2,630,381

UNITED STATES PATENT OFFICE 2,630,381

HERBICIDES

Arthur H. Schlesinger and Milton Kosmin, Dayton, Ohio, assignors to Monsanto Chemical Company, St. Louis, Mo., a corporation of Delaware No Drawing. Application November 21, 1950, Serial No. 196,957

8 Claims. (Cl. 71—2.5)

The present invention relates to herbicides and deals more particularly with methods for the selective destruction of undesired plants.

A number of selective herbicides are known, a variety of organic and inorganic compounds having been suggested in the prior art for use as plant-killers. Among the disadvantages of the known selective herbicides may be mentioned corrosive effect on equipment, chemical reactivity with other components customarily employed in agricultural sprays or powders, instability when exposed for long periods of time to ordinary atmospheric conditions, and soil instability, e. g. chemical reactivity with soil components and susceptibility to decomposition by soil microorganisms, which results in loss of the active material.

An object of the invention is to provide a method of destroying broad-leafed plants without injuring adjacent narrow-leafed plants. Another object of the invention is to provide readily available deweeding compositions. Still another object is the provision of stable, substantially non-corrosive deweeding compositions.

These and other objects of the invention hereinafter defined are provided by the following invention in which very efficient deweeding compositions are prepared by employing as the active ingredient a benzoxazole derivative having the general formula

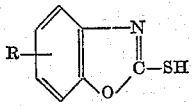

in which R is selected from the class consisting of hydrogen, chlorine, the nitro radical and alkyl radicals of from 1 to 4 carbon atoms. As illustrative of compounds having the above general formula may be mentioned 2-mercaptobenzoxazole, 4-chloro-2-mercaptobenzoxazole, 6-methyl-2-mercaptobenzoxazole, 5-isobutyl-2-mercaptobenzoxazole, 7-nitro-2-mercaptobenzoxazole, etc. The present 2-mercaptobenzoxazole compounds are readily obtainable by reaction of 2-aminophenols with carbon disulfide according to the scheme:

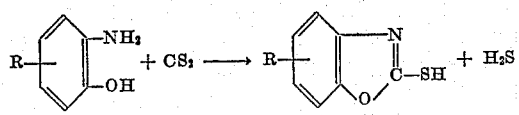

in which R is selected from the class consisting of hydrogen, chlorine, the nitro radical and alkyl radicals of from 1 to 4 carbon atoms.

The present mercaptobenzoxazoles are effective over wide ranges of concentrations. Their effects may be measured by determining the inhibition of root growth as compared to similar, untreated plants. For selective herbicidal activity it is necessary to have a concentration at which substantial inhibition occurs with respect to broad-leafed plants, but at which concentration narrow-leafed plants are substantially unharmed. The selective activity may also be measured by comparing the concentrations of a herbicide required to produce a certain inhibition of growth on a broad-leafed plant with the concentrations of the herbicide which are required to produce the same inhibition of growth on a narrow-leafed plant. For evaluation in many laboratories the cucumber has been adopted as a typical broad-leafed dicotyledonous plant for technical reasons, and wheat has been used as a standard narrow-leafed monocotyledonous plant.

The present invention is illustrated, but not limited, by the following examples:

Example 1

The herbicidal activity of 2-mercaptobenzoxazole was determined by germination of cucumber seeds for 4 days at a temperature of 76° F. in the presence of an aqueous suspension of 100 parts by weight of the benzoxazole compound per million parts of water. Seventy-five seeds were used for each test. The length of the primary roots of the resulting seedlings was only 20% of the root length of seedlings which had been germinated in water, but in the absence of the chemical.

Similarly good results are obtained by employing, instead of 2-mercaptobenzoaxazole its nuclear derivatives such as 6-chloro-2-mercaptobenzoxazole, 4-n-propyl-2-mercaptobenzoxazole, 7-ethyl-2-mercaptobenzoxazole, 5-nitro-2-mercaptobenzoxazole, etc.

The herbicidal efficiency of the present 2-mercaptobenzoxazoles is remarkable, because as shown in the table given below heterocyclic compounds of nitrogen and/or oxygen do not generally possess great herbicidal efficiency. When tested as described above, aqueous suspensions of a random group of such compounds were found to have the following effects:

| Compound tested: | Per cent root growth at 100 p. p. m. |
|---|---|
| 2-chloroethylmercaptobenzothiazole | 95 |
| 1-hydroxyethylbenzotriazole | 89 |
| 2-chloropyridine | 79 |
| 2-phenyl-1,3,4-benzoxazone | 69 |

*Example 2*

2-mercaptobenzoxazole was tested with both cucumber and wheat seeds, employing the procedure described in Example 1. The percent growth inhibition of cucumber seedling roots was twice that of the wheat roots.

The present 2-mercaptobenzoxazole compounds are preferably applied by spraying aqueous suspensions of the same, this method affording an easy and inexpensive way of destroying plant growth. However, they are likewise effective when applied as dusts, for example, in admixture with such carriers as clay, lime, talc, bentonite, pumice, fuller's earth, etc. The present compounds are soluble in the usual organic solvents and may be used in solution, e. g., in kerosene or benzene solution as herbicidal sprays.

Sprays or dusts may be used to destroy already existing plant growth by direct application to the undesirable plants, or they may be employed to prevent the plant growth, for example in parking areas, highway abutments, railway yards, etc. They may be applied either as an aqueous spray or dust or they may be admixed with customarily employed temporary surfacing materials, e. g., oils, cinders, etc. The present invention thus provides a generally useful method of preventing and destroying undesirable plant growth.

Only small amounts of the present herbicidal materials need be employed. For general utility, concentrations of from say, 0.1 part to 20 parts of the 2-mercaptobenzoxazole compound per hundred parts by weight of the carrier may be employed, and in this manner an acre of land may be freed of plants by application of only a few pounds of one of the present herbicides.

What we claim is:

1. The method of destroying undesired plants which includes applying to said plants a toxic quantity of a herbicidal composition comprising, as the active ingredient, a benzoxazole derivative having the general formula

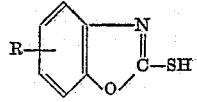

in which R is selected from the class consisting of hydrogen, chlorine, the nitro radical, and alkyl radicals of from 1 to 4 carbon atoms.

2. The method of destroying undesired plants which includes applying to said plants a toxic quantity of a herbicidal composition comprising a carrier and, as the active ingredient, a benzoxazole derivative having the general formula

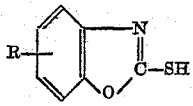

in which R is selected from the class consisting of hydrogen, chlorine, the nitro radical, and alkyl radicals of from 1 to 4 carbon atoms.

3. The method of destroying undesired plants which comprises applying to said plants a toxic quantity of an aqueous suspension of a benzoxazole derivative having the general formula

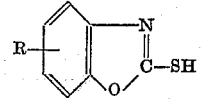

in which R is selected from the class consisting of hydrogen, chlorine, the nitro radical, and alkyl radicals of from 1 to 4 carbon atoms.

4. The method of destroying undesired plants which comprises applying to said plants a toxic quantity of a herbicidal composition including a carrier and 2-mercaptobenzoxazole as the active ingredient.

5. The method of destroying undesired plants which comprises applying to said plants a toxic quantity of a herbicidal composition including a carrier and 6-chloro-2-mercaptobenzoxazole as the active ingredient.

6. The method of destroying undesired plants which comprises applying to said plants a toxic quantity of a herbicidal composition including a carrier and 4-n-propyl-2-mercaptobenzoxazole as the active ingredient.

7. The method of destroying undesired plants which comprises applying to said plants a toxic quantity of a herbicidal composition including a carrier and 7-ethyl-2-mercaptobenzoxazole as the active ingredient.

8. The method of destroying undesired plants which comprises applying to said plants a toxic quantity of a herbicidal composition including a carrier and 5-nitro-2-mercaptobenzoxazole as the active ingredient.

ARTHUR H. SCHLESINGER.
MILTON KOSMIN.

REFERENCES CITED

The following references are of record in the file of this patent:

UNITED STATES PATENTS

| Number | Name | Date |
|---|---|---|
| 2,468,075 | Jayne et al. | Apr. 26, 1946 |

OTHER REFERENCES

Beilstein's Handbuck der Organische Chemie, 4th edition, vol. 27, page 181 (1937).